3,360,587
ETHYLENE PRODUCTION AND RECOVERY
THEREOF
George F. Adams, Tulsa, Okla., assignor, by mesne assignments, to UOP Process Division (a division of Universal Oil Products Company), a corporation of Delaware
Filed July 29, 1966, Ser. No. 568,792
10 Claims. (Cl. 260—683)

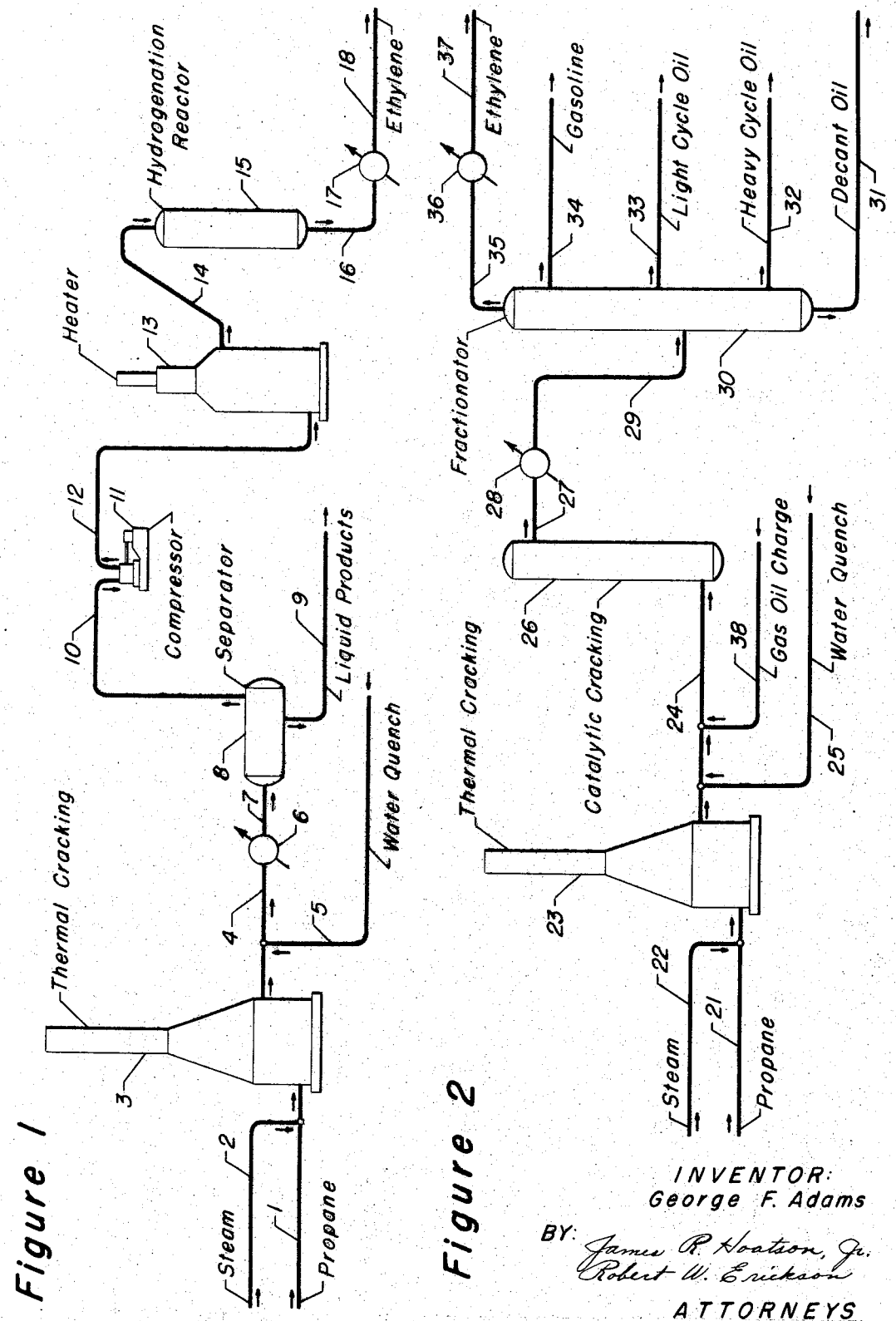

ABSTRACT OF THE DISCLOSURE

Separation of ethylene from acetylene, butadiene and other contaminants contained in the effluent from the thermal cracking of saturated hydrocarbons by introduction of said effluent into the reaction zone of a heavy oil catalytic cracking process.

---

The present application is a continuation-in-part of my copending application, Ser. No. 388,132, filed Aug. 7, 1964, now abandoned. The inventive concept herein described involves the production of ethylene from saturated hydrocarbons, and is particularly directed toward an improved method for the recovery of an ethylene-rich gaseous stream. More specifically, the present invention encompasses a combination process for the production and recovery of ethylene, which combination process involves the pyrolysis (thermal cracking) of saturated hydrocarbons, followed by the catalytic cracking of the total pyrolysis effluent. Through the use of the present invention, the recovery of ethylene from the pyrolysis effluent is significantly more economical, notwithstanding the presence of undesirable constituents in the ethylene-rich pyrolysis effluent.

Ethylene, as a result of its great degree of reactivity, is extensively employed in a variety of commercial industries including the petroleum, petrochemical, pharmaceutical, plastics industry, heavy chemical, etc. Widespread use of ethylene as a raw material in the manufacture of numerous synthetic petroleum-derived chemical products, fuel, etc., is practiced. For example, ethylene is used as the source of great quantities of ethyl and ethylene compounds including ethylene oxide, ethyl alcohol, ethylene dichloride and polyethylene, etc. Ethylene is employed to a large extent in the alkylation of aromatic hydrocarbons, such as benzene, to yield alkylaromatics, such as ethylbenzene. A principal use of ethylbenzene resides in the dehydrogenation thereof to produce styrene. Within the petroleum industry, there has, therefore, been created a necessity not only for large quantities of ethylene, but also for methods and means for the more efficient, economical recovery and use thereof.

The prior art indicates that ethylene is generally prepared via the pyrolysis, or thermal cracking, of saturated light hydrocarbons, including ethane and/or propane, light naphthas having boiling ranges up to about 170° F., and, in many instances, higher boiling hydrocarbon mixtures, etc. Thermal cracking of such hydrocarbons is usually conducted at conditions including a temperature within the range of from about 1200° F. to about 1500° F., at pressures of from about atmospheric to about 30.0 p.s.i.g., and for relatively short contact times ranging from 1.0 to about 5.0 seconds. In many prior art thermal cracking processes, steam is admixed with the hydrocarbon charge, generally in an amount of from 1.0 to 10.0 mols per mol of hydrocarbon; such processes are often referred to as "steam-cracking." Under these conditions, a normally gaseous, thermally-cracked product effluent results, and consists principally of ethylene, propylene, acetylene, butadiene unreacted hydrocarbonaceous charge stock, etc.

For the purpose of enhancing the results obtained, regardless of the use for which the ethylene-rich cracked product is intended, it is necessary that the ethylene be concentrated through the recovery thereof from the total cracked product effluent.

In particular, the removal of acetylene and butadiene from the ethylene-rich stream, prior to the use thereof, is not only desired, but essential in many instances. For example, in a process for the alkylation of benzene, to produce ethylbenzene, strict limitations are placed upon the acetylene and butadiene content of the ethylene-rich feed gas. The presence of these "contaminants," as a result of undesirable side reactions, fosters the formation of di-phenyl butanes and di-phenyl ethanes, which products create an environment within the reaction zone which is conductive to catalyst poisoning. Furthermore, acetylene and butadiene, as well as other olefins having more than a single double-bond, have the strong tendency to undergo polymerization reactions, forming heavy carbonaceous material which becomes deposited on the catalytic composite, thereby shielding the active centers and surfaces from the material being processed.

In addition to contaminants such as acetylene and butadiene, pyrolysis ethylene-rich effluent contains tarry material and certain liquid by-products which are unstable, and present treating and disposal problems. With respect to prior art thermal cracking processes, the recovery of an ethylene-rich gaseous phase, substantially free from actylene, butadiene and other olefins having more than one double-bond, involves an expensive, tedious series of processing techniques including quenching, cooling, compressing, hydrogenation (especially directed at the acetylene and butadiene contaminants), and fractionation, etc. Thus, the pyrolysis effluent is generally initially quenched with water and cooled to facilitate the removal, or separation of tarry material and normally liquid by-products. Following this separation, the gaseous phase is compressed and subjected to high-pressure, high temperature hydrogenation whereby the undesirable olefin products must be selectively hydrogenated, while the ethylene product remains unchanged. At this point, the ethylene-rich stream contains some butylene (resulting from the partial hydrogenation of butadiene), hydrogen, methane, ethane, propane and propylene. In many instances, the presence of these constituents is not detrimental to the intended use of the ethylene, and no further treatment is needed; in other situations, the stream is fractionated for the purpose of further concentrating the ethylene.

A principal object of the present invention is to provide a process which eliminates any or all of the quenching, cooling, liquid separation, compression, and especially the expensive technique of catalytic hydrogenation to remove or reduce the acetylene and butadiene.

Another object involves the production and recovery of an ethylene-rich gaseous phase in a manner which is significantly more economical than heretofore practiced, and which simultaneously results in an ethylene-containing product suitable for immediate use without further treatment.

Therefore, in a broad embodiment, the present invention relates to a process for the production and recovery of ethylene which comprises thermal cracking saturated hydrocarbons at conditions conductive to producing an ethylene-rich effluent, commingling the total ethylene-rich effluent with the hydrocarbon charge to a catalytic cracking unit, passing the resulting mixture into a reaction zone maintained under cracking conditions selected to produce gasoline boiling range hydrocarbons from heavier hydrocarbons and recovering an ethylene-rich gaseous phase from the resulting catalytically-cracked product effluent.

Another embodiment of the present invention affords an improvement in a process for producing ethylene via the pyrolysis of a saturated hydrocarbon, in which process the pyrolysis effluent contains acetylene, which improvement comprises introducing the total pyrolysis effluent into a catalytic cracking reaction zone maintained under conditions selected to produce gasoline boiling range hydrocarbons from heavier hydrocarbons and recovering an ethylene-rich gaseous phase of reduced acetylene content from the resulting catalytically cracked product effluent.

From the foregoing embodiments, it will be noted that my inventive concept involves a combination process wherein the total pyrolysis effluent is subjected to a catalytic cracking unit. The process may be further characterized in that the thermal cracking of the saturated hydrocarbon, for example, an ethane-propane mixture, is effected at conditions conducive to the production of ethylene, and including a temperature of from 1200° F. to about 1500° F., a pressure of from atmospheric to about 30.0 p.s.i.g. and for a period of from about 1.0 to 5.0 seconds. When effected in the presence of steam, the steam-hydrocarbon mixture will be such that the steam/hydrocarbon mol ratio lies in the range of 1.0 to about 10.0. The catalytic cracking will be conducted using any suitable cracking catalyst—the prior art is replete with suggestions of such catalyst—at operating conditions which include a pressure from atmospheric to about 30.0 p.s.i.g. and a temperature within the range of from about 850° F. to about 1050° F. Usually, the pressure on the thermal cracking unit will be at least slightly greater than that imposed upon the catalytic cracking zone. A preferred mode of operation involves commingling the entire pyrolysis effluent with the heavy hydrocarbon charge to the catalytic cracking unit, wherein gasoline boiling range hydrocarbons are produced from the heavier hydrocarbonaceous material. The combinative process of this invention is unique in that prior art, and those having expertise therein, have indicated that such a scheme would destroy the ethylene produced in the thermal cracking unit. As hereinafter indicated, this is definitely not the result experienced through the use of the present invention.

The present invention, and the comparison thereof with a typical prior art process, may be clearly understood by reference to the accompanying figures. In these fiures, various valves, controllers, reboiler heaters and other miscellaneous appurtenances, have either been reduced in number, or eliminated as not being essential to a complete understanding of my invention. Such items will be readily recognized by those skilled within the art of petroleum refining techniques. It is understood that the figures are presented for the sole purpose of illustration, and are not to be construed as limiting upon the present invention as defined by the scope and spirit of the appended claims.

With reference now to the drawings, FIGURE 1 is representative of a conventional prior art process for the pyrolysis of a saturated hydrocarbon to produce ethylene. The saturated hydrocarbon, for example, propane, enters the process through line 1, being admixed with steam from line 2, prior to passing into thermal cracking unit 3. The pyrolysis effluent is removed through line 4, is water-quenched via line 5, and continues through cooler 6 and line 7 into separator 8. The quench of the pyrolysis effluent is necessary in order to terminate the reaction and permit a heat-exchanger of reasonable size downstream. The normally liquid hydrocarbons, including tarry material, is removed from separator 8 via line 9, and the normally gaseous phase is removed via line 10. Although not indicated in the drawing, the gaseous phase in line 10 will require additional treatment to effect the removal of water, carbon oxides, etc. The treated gaseous phase is raised to hydrogenation pressure, by compressor 11, and passes through line 12 into heater 13. Heater 13 serves to raise the temperature of the ethylene-rich stream to the level required for the selective hydrogenation of acetylene and/or butadiene. The heated charge passes through line 14, in admixture with a hydrogen-rich stream not illustrated, into hydrogenation reactor 15. An ethylene-rich stream, substantially free from acetylenes and butadiene, is removed through line 16, and its temperature is lowered in cooler 17. The ethylene product is then sent to storage or subsequent processing via line 18.

These recovery steps involve considerable processing equipment and control, all of which is expensive to install and maintain, and which further burdens significantly the economics attendant the production of ethylene. Handling the pyrolysis effluent gases, and the separation of the tarry material and liquid by-products therefrom, presents considerable difficulties and constitutes many real disadvantages. Particularly annoying and uneconomical is the need for separate catalytic hydrogenation to reduce the concentration of acetylene and butadiene. Considering only the economic aspects, it becomes extremely desirable to eliminate any or all of these intricate separation and recovery facilities.

As indicated in the foregoing embodiments, in accordance with the present invention, the total ethylene-rich gaseous effluent from the pyrolysis unit is introduced into a catalytic cracking reactor which is maintained under operating conditions conducive to the production of gasoline boiling range hydrocarbons from a hydrocarbonaceous charge stock having a boiling range above the gasoline boiling range. Thus, referring now to FIGURE 2:

A saturated hydrocarbon, having at least two carbon atoms per molecule, or a mixture of saturated hydrocarbons, for example propane, enters the process through line 21, being admixed with from 1.0 to about 10.0 mols of steam, per mol of propane, introduced through line 22. The mixture passes into thermal cracking unit 23 which is maintained under a pressure ranging from about atmospheric to 200 p.s.i.g., preferably having an upper limit of about 30.0 p.s.i.g., and a temperature of from about 1200° F. to about 1500° F. The cracked product effluent from unit 23 is removed via line 24, is quenched with water, oil, or other suitable quenching medium in line 25, and continues through line 24 directly into catalytic cracking reactor 26 which is operating at conditions conducive to the production of gasoline boiling range hydrocarbons from heavier hydrocarbons. The operating conditions are generally such that the pressure is within the range of from about atmospheric to about 30.0 p.s.i.g. and a temperature of from about 850° F. to about 1050° F.

As hereinbefore set forth in a preferred embodiment, the total pyrolysis effluent is admixed with a conventional hydrocarbon charge to a catalytic cracking unit, such as a gas oil being introduced via line 38. Under such conditions, the heavy hydrocarbons are converted via cracking reactions into volatilizable products of lower molecular weight, including gasoline, kerosene, middle-distillate oils, heavy cycle stocks and decant oils, etc. Catalytic cracking processes are well-known and rather well-defined in the prior art and published literature; it is understood that no claim is herein made to such conventional cracking processes since any of these can be readily employed in the practice of this invention.

The effluent vapors from catalytic cracking unit 26, following internal separation of the catalyst particles, are removed through line 27 into cooler 28 wherein the temperature thereof is lowered. Cooled catalytically-cracked effluent is introduced into fractionator 30, via line 29, in which the desired product boiling range distribution is obtained. Thus, for example, decant oil is removed as a bottoms product via line 31, while a heavy cycle oil is removed at an intermediate point through line 32. Generally, the fractionator 30 is maintained at conditions of temperature and pressure such that the overhead product, leaving via line 35 contains the $C_4$ and lighter hydrocarbon products, while the pentanes and heavier gasoline boiling range material is withdrawn through line 34. Any pentanes and heavier hydrocarbons contained in the overhead fraction may be condensed in cooler 36 and either returned as reflux, or added to the gasoline product in line 34. When desired, a light middle-distillate, or kerosene fraction, is withdrawn through line 33. It is understood that the fractionator 30, as shown, may be modified in any manner which facilitates obtaining the desired product distribution. The gaseous phase not condensed in cooler 36 is withdrawn through line 37, and constitutes the ethylene-rich gaseous phase product of the present combinative process. This gaseous phase contains the ethylene from the pyrolysis unit, in addition to other light hydrocarbon gases from the pyrolysis unit, in admixture with the light hydrocarbon gases produced via the catalytic cracking reaction. The latter gases have virtually the same hydrocarbon composition, including ethylene, as the gases from the pyrolysis unit. As hereinafter indicated by example, and in greater detail, there are exceptions to this, principally with respect to the acetylene and butadiene content.

I have found that, when the present process is conducted along the lines illustrated above, the catalytic cracking unit, operating in conventional fashion, serves exceptionally well for treating and separating the product effluent from the pyrolysis of saturated hydrocarbons, and effects such recovery and separation while eliminating several of the numerous steps involved in the prior art process previously described. For example, tarry material in the pyrolysis effluent tend to crack, at least in part into normally liquid hydrocarbons, or deposit on the catalytic composite from which they are readily removed during regeneration. Unstable liquid pyrolysis products are converted, via cracking reactions to stable liquid products which are subsequently recovered. Of prime import is the fact that the acetylene and butadiene concentrations of the pyrolysis effluent have been reduced to within tolerable limits without the use of an extremely costly hydrogenation facility and its attendant equipment. Furthermore, this has been accomplished without loss of ethylene product, which result is contrary to the opinion of those skilled in the art of catalytic cracking operations, and diametrically opposed to the teachings of the prior art which indicates ethylene disappearance where, for example, a $C_2$–$C_3$ fraction is recycled from the catalytically-cracked product effluent to the cracking zone charge stock. Exemplary of such a prior art process is one describing a combination cracking/dehydrogenation operation having multiple feed points into the combination reaction zone. In this process, the principal object of which is to produce an aromatic-rich gasoline blending stock and increased quantities of butadiene, the product effluent is fractionated and separated to provide a gas oil and heavier product, a debutanized gasoline boiling range product (rich in aromatic hydrocarbons) and a butadiene-concentrate as a product. During the separation of these specifically desired products, a $C_2$–$C_3$ concentrate is obtained. This stream is utilized, in this prior art process, as a feed diluent and heat-control means by injection into the reaction zone via the multiple feed points. Allegedly, this accomplishes the attainment of increased aromatic hydrocarbon yield and butadiene production. Furthermore, the recycle of this $C_2$–$C_3$ diluent in this manner is stated as repressing the formation of additional light gases, promoting the dehydrogenation of butenes to form butadiene and encouraging the polymerization of ethylene, such that higher boiling hydrocarbons are produced therefrom. Contrary to this scheme which specifically intentionally effects the destruction of ethylene, the combinative process of the present invention preserves the ethylene produced via pyrolysis of the saturated hydrocarbons. Unexpectedly, in addition, the present process effects a substantial reduction in the acetylene and butadiene concentrations such that the final ethylene-rich product is suitable for immediate use without further intricate treatment.

The following example is presented to illustrate further the benefits to be afforded through the use of the present invention. It is not intended to limit the present invention, however, to the exact charge stocks, operating conditions, etc., as employed in this example.

EXAMPLE

A propane-rich normally gaseous fraction was subjected to pyrolysis in a thermal cracking unit at a pressure of 30.0 p.s.i.g. The temperature at the outlet of the furnace was 1385° F. The charge rate to the furnace was 2,157 lbs./hr., and an analysis of the charge is presented in the following Table I, along with the analysis of the product effluent:

TABLE I.—PROPANE FURNACE BALANCE

|  | Charge | Effluent |
|---|---|---|
| Total, pounds/hour | 2,157 | 2,157 |
| Analysis, Mol. percent: |  |  |
| Carbon monoxide |  | 0.3 |
| Hydrogen |  | 15.7 |
| Methane |  | 27.5 |
| Ethylene |  | 24.7 |
| Ethane | 12.6 | 13.1 |
| Nitrogen |  |  |
| Carbon dioxide |  |  |
| Propylene | 3.8 | 9.0 |
| Propane | 82.1 | 8.8 |
| Butanes plus | 1.5 | 0.9 |
| Acetylene, p.p.m. by weight | 0 | 1,300 |
| Butadiene, Mol. percent in butanes | 0 | 0.6 |

This product effluent was admixed, in toto, with the gas oil charge to a conventional catalytic cracking unit having a fresh feed capacity of 17,500 bbl./day. The catalytic cracking zone was maintained at a temperature of 960° F. and under a pressure of about 17.0° p.s.i.g. The product was subjected to fractionation and separation to provide a depentanized gaseous phase rich in ethylene. The analysis of this gaseous phase is presented in the following Table II, along with the analysis obtained on the gaseous phase resulting from the cracking of gas oil when the total pyrolysis effluent was not admixed therewith:

TABLE II.—CATALYTIC CRACKING COMPARISON

|  | Normally Gaseous Effluent | |
|---|---|---|
|  | Without Propane Effluent | With Propane Effluent |
| Total, pounds/hour | 13,719 | 15,276 |
| Analysis, Mol. percent: |  |  |
| Carbon monoxide | 2.0 | 1.8 |
| Hydrogen | 12.8 | 13.5 |
| Methane | 36.9 | 36.4 |
| Ethylene | 9.5 | 11.7 |
| Ethane | 15.0 | 15.0 |
| Nitrogen | 12.0 | 10.7 |
| Carbon dioxide | 2.5 | 2.2 |
| Propylene | 6.6 | 6.1 |
| Propane | 2.0 | 2.0 |
| Butanes plus | 0.7 | 0.6 |
| Acetylene, p.p.m. by weight | 16 | 43 |
| Butadiene, mol. percent in butanes | 0.12 | 0.15 |

Some of the more salient observations reflected by the data in Tables I and II, include the fact that the gaseous effluent from the catalytic cracking unit (in the case where the pyrolysis effluent was not admixed with the gas oil charge) is suitable for subsequent use without further treatment to remove acetylene and butadiene. The acetylene content, for example, of 16 p.p.m. by weight, is less than 0.005%. Contrasted to this is the fact that without further treatment or processing in accordance with the present invention, the pyrolysis effluent is not suitable due to the acetylene content of 1300 p.p.m., more than 0.10%. Similarly, with respect to butadiene, considering first the catalytic cracking effluent, of the total butane-plus fraction (0.7 mol percent of the total gaseous phase), only 0.12 mol percent is butadiene. With respect to the "as-produced" pyrolysis effluent, the butane-plus fraction is 0.9 mol percent of the total gaseous phase, and 0.6 mol percent of this is butadiene.

In accordance with the present inventive concept, when the total pyrolysis effluent is admixed with the charge to the catalytic cracking unit, the acetylene content of the gaseous effluent is 43 p.p.m., or less than 0.005%, and the butadiene concentration is 0.15 mol percent of a butane-plus fraction which amounts to 0.6 mol percent of the total gaseous effluent. An acetylene balance, comparing the aggregate of the pyrolysis and cat-cracking effluents with the effluent resulting from the addition of the pyrolysis effluent to the cracking charge, indicates that the method of the present invention has resulted in a total acetylene reduction of virtually 80.0% by weight. Similarly, the butadiene balance indicates a 40.0% by weight reduction.

That these unique results are obtained without incurring the disadvantage attendant ethylene conversion or destruction in the catalytic cracking unit, becomes evident from an ethylene balance. On a mols/hour basis, the pyrolysis effluent contains 22.4 mols of ethylene (628 pounds), while the effluent from the catalytic cracking unit contains 58.5 mols of ethylene (1635 pounds). The aggregation of these two streams is 80.9 mols of ethylene (2263 pounds). The ethylene produced when the pyrolysis effluent is commingled with the gas oil charge stock is 81.8 mols (2295 pounds), obviously indicating that none of the ethylene from the pyrolysis effluent is "lost" in the catalytic cracking zone. Further evidence of the fact that the pyrolysis effluent is virtually unchanged in the catalytic cracking unit, obviously with the exception of acetylene and butadiene conversion, resides in a methane balance. The aggregate of the separate streams is 252.0 mols per hour, whereas the methane production when the present invention is practiced, is 251.0 mols.

The foregoing specification and example clearly illustrate the method by which the present invention is conducted, and indicate the benefits to be afforded through the utilization thereof in a process for the production and recovery of ethylene.

I claim as my invention:

1. A process for the production and recovery of ethylene which comprises thermal cracking saturated hydrocarbons at conditions conducive to producing an ethylene-rich effluent containing acetylene and butadiene, commingling the total ethylene-rich effluent, including said acetylene and butadiene, with the hydrocarbon charge to a catalytic cracking unit, passing the resulting mixture into a reaction zone maintained under cracking conditions selected to produce gasoline boiling range hydrocarbons from heavier hydrocarbons and recovering an ethylene-rich gaseous phase of reduced acetylene and butadiene content from the resulting catalytically-cracked product effluent.

2. The process of claim 1 further characterized in that said thermal cracking conditions include a temperature within the range of from about 1200° F. to about 1500° F. and a pressure of from atmospheric to about 30.0 p.s.i.g.

3. The process of claim 1 further characterized in that said catalytic cracking conditions include a pressure of from atmospheric to about 30.0 p.s.i.g. and a temperature of from about 850° F. to about 1050° F.

4. The process of claim 1 further characterized in that said saturated hydrocarbons comprise propane.

5. A process for the production and recovery of ethylene which comprises thermal cracking a propane-containing hydrocarbon charge stock, quenching the resulting thermal cracked effluent, commingling the total quenched effluent, including acetylene, butadiene, tarry material and unstable liquid by-products, with the hydrocarbon charge to a catalytic cracking unit, passing the resulting mixture into a reaction zone maintained under cracking conditions selected to produce gasoline boiling range hydrocarbons from heavier hydrocarbons and recovering an ethylene-rich gaseous phase from the resulting catalytically-cracked product effluent.

6. In a process for producing ethylene by the pyrolysis of a saturated hydrocarbon, in which process the ethylene-rich pyrolysis effluent contains acetylene, the improvement which comprises introducing the total pyrolysis effluent, including said acetylene, into a catalytic cracking reaction zone to which a heavy hydrocarbon charge is also introduced and which is maintained under conditions selected to produce gasoline boiling range hydrocarbons from said heavy hydrocarbons and recovering an ethylene-rich gaseous phase of reduced acetylene content from the resulting catalytically cracked product effluent.

7. The improved process of claim 6 further characterized in that said pyrolysis effluent is admixed with the hydrocarbon charge to said catalytic cracking reaction zone.

8. The improved process of claim 6 further characterized in that said pyrolysis effluent is quenched prior to introduction into said catalytic cracking zone.

9. The improved process of claim 6 further characterized in that said ethylene-rich pyrolysis effluent contains acetylene and butadiene, and said recovered ethylene-rich gaseous phase is reduced in acetylene and butadiene content.

10. The improved process of claim 6 further characterized in that said catalytic cracking conditions include a pressure in the range of from about atmospheric to about 30.0 p.s.i.g. and a temperature of from 850° F. to about 1050° F.

References Cited

UNITED STATES PATENTS

| | | | |
|---|---|---|---|
| 2,415,537 | 2/1947 | Schulze et al. | 260—683 |
| 2,656,307 | 10/1953 | Findlay | 260—683 |
| 3,065,165 | 11/1962 | Amis et al. | 208—130 |

PAUL M. COUGHLAN, Jr., *Primary Examiner.*

DELBERT E. GANTZ, *Examiner.*

C. E. SPRESSER, *Assistant Examiner.*